US012609565B2

(12) United States Patent
Ding et al.

(10) Patent No.: US 12,609,565 B2
(45) Date of Patent: Apr. 21, 2026

(54) SYSTEMS AND METHODS FOR ASYMMETRICAL DELTA SHAPE INTERIOR PERMANENT MAGNET MACHINE

(71) Applicant: Rivian IP Holdings, LLC, Plymouth, MI (US)

(72) Inventors: Hao Ding, Irvine, CA (US); Khwaja Rahman, Troy, MI (US); Fan Wu, Rancho Palos Verdes, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 267 days.

(21) Appl. No.: 18/305,890

(22) Filed: Apr. 24, 2023

(65) Prior Publication Data

US 2024/0356397 A1      Oct. 24, 2024

(51) Int. Cl.
H02K 1/27 (2022.01)
H02K 1/276 (2022.01)
(52) U.S. Cl.
CPC .................................. H02K 1/2766 (2013.01)
(58) Field of Classification Search
CPC ...... H02K 1/2766; H02K 1/276; H02K 21/14; H02K 2201/06; H02K 2213/03
See application file for complete search history.

(56) References Cited

U.S. PATENT DOCUMENTS

2021/0135522 A1*  5/2021  Dong ................... H02K 1/2773
2022/0060071 A1*  2/2022  Xiao ...................... H02K 1/274

FOREIGN PATENT DOCUMENTS

CN       108777522 A  * 11/2018  ........... H02K 1/2773

OTHER PUBLICATIONS

Ya Li, et al., "A Novel Magnet-Axis-Shifted Hybrid Permanent Magnet Machine for Electric Vehicle Applications"; Energies 2019, 12, 641, Feb. 16, 2019, p. 1-13.
Zi-Qiang Zhu and Yang Xiao, "Novel Magnetic-Field-Shifting Techniques in Asymmetric Rotor Pole Interior PM Machines With Enhanced Torque Density"; IEEE Transactions on Magnetics. vol. 58, No. 2, Feb. 2022, Feb. 2, 2022, 10 pages.

* cited by examiner

*Primary Examiner* — Thomas Truong
(74) *Attorney, Agent, or Firm* — Foley & Lardner LLP

(57) ABSTRACT
Systems and methods for an asymmetrical delta shape interior permanent magnet machine include rotor having a plurality of magnets arranged on an interior of the rotor. The plurality of magnets can include a first magnet having a first size, a second magnet having a second size, and a third magnet having a third size. The first magnet, the second magnet, and the third magnet can be arranged in a triangular shape. Each of the first size, the second size, and the third size can be different from one another.

16 Claims, 8 Drawing Sheets

SYSTEMS AND METHODS FOR ASYMMETRICAL DELTA SHAPE INTERIOR PERMANENT MAGNET MACHINE

INTRODUCTION

Motors have a rotor and a stator. Some motors, referred to as interior permanent magnet (IPM) motors or machines, may include one or more magnets.

SUMMARY

This disclosure is generally directed to an interior permanent magnet (IPM) machine with magnets arranged in an asymmetrical delta shape. IPM machines described herein can have magnets that are positioned, located or arranged in a manner that results in a peak reluctance torque that is not angularly aligned with a peak magnetic torque produced the magnets. Where the peak reluctance and magnetic torques are misaligned, the resultant (or total) motor output torque may not be optimized.

According to the present solution, the magnets may be provided or arranged in an asymmetrical delta shape, comprising three magnets, arranged in a generally triangular shape. The asymmetrical delta shape may be obtained by varying the length, thickness, angles, or position of one or more of the three magnets. For example, the asymmetrical delta shape can be achieved by providing magnets with the same length but different thicknesses which are mounted at the same angle (e.g., relative to an axis of the rotor), by providing magnets with the same thickness but different lengths at different angles relative to the axis of the rotor, or by providing magnets of different thicknesses and lengths at different angles (and various different combinations thereof). Additionally, the top magnet (e.g., atop the magnets forming the V-shape and extending perpendicular to the axis of the rotor) can be shifted towards one of the magnets, to provide a further shift in the magnetic torque axis. The asymmetrical delta shape may shift the magnet torque axis, thereby more closely aligning the peak magnetic torque to the peak reluctance torque, resulting in higher total motor output torque.

At least one aspect is directed to a rotor. The rotor can include a plurality of magnets arranged on an interior of the rotor. The plurality of magnets can include a first magnet having a first size, a second magnet having a second size, and a third magnet having a third size. The first magnet, the second magnet, and the third magnet can be arranged in a triangular shape. Each of the first size, the second size, and the third size can be different from one another.

At least one aspect is directed to a motor. The motor can include a rotor. The motor can include a plurality of magnets arranged on an interior of the rotor. The plurality of magnets can include a first magnet having a first size, a second magnet having a second size, and a third magnet having a third size. The first magnet, the second magnet, and the third magnet can be arranged in a triangular shape. Each of the first size, the second size, and the third size can be different from one another.

At least one aspect is directed to a method. The method can include providing a plurality of magnets including a first magnet having a first size, a second magnet having a second size, and a third magnet having a third size. Each of the first size, the second size, and the third size can be different from one another. The method can include positioning the plurality of magnets in an interior of a rotor of a motor. The plurality of magnets can be positioned in a triangular shape.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
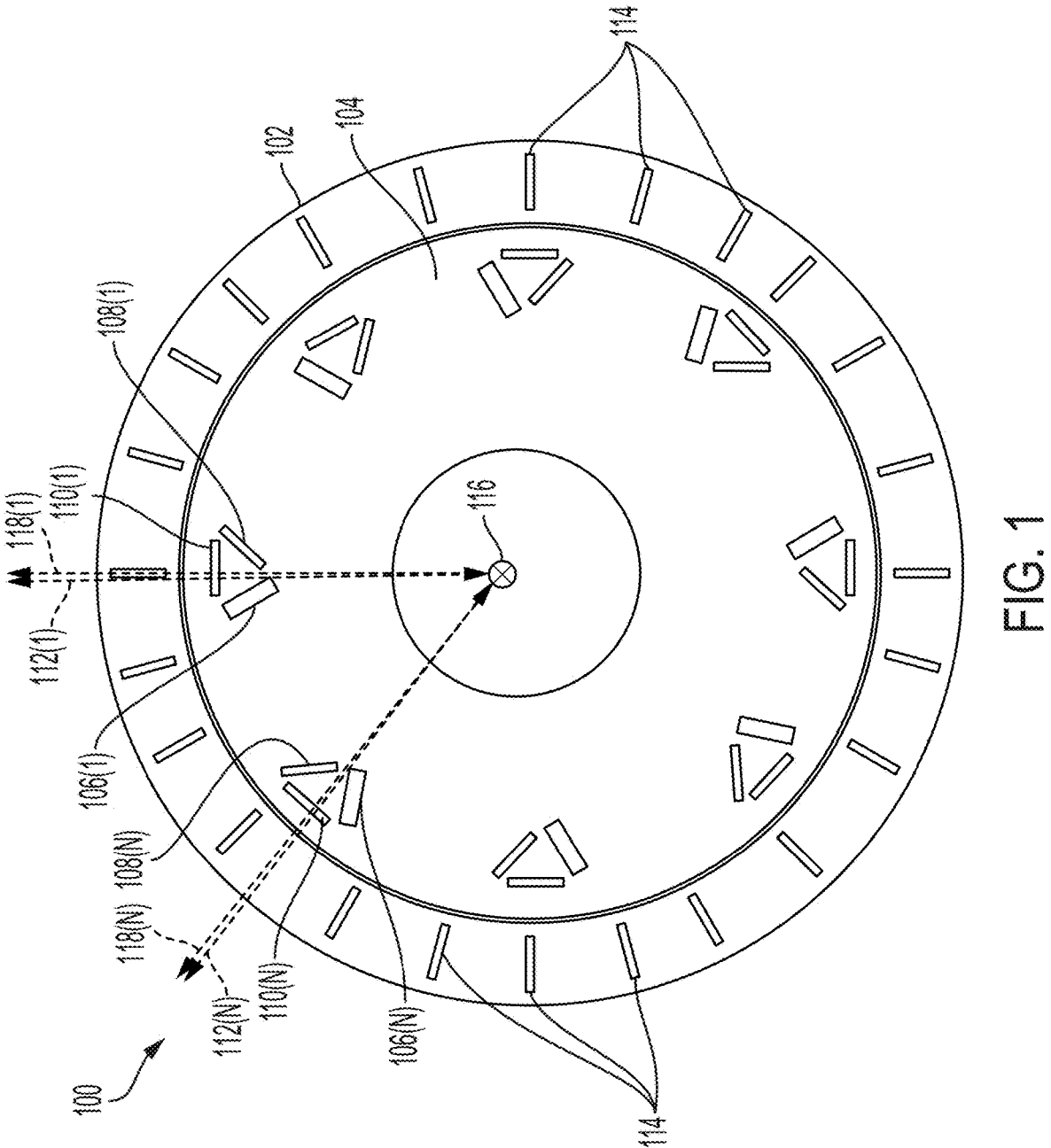
FIG. 1 depicts an example interior permanent magnet (IPM) motor.

Following below are more detailed descriptions of various concepts related to, and implementations of, methods, apparatuses, and systems of an electric vehicle battery architecture. The various concepts introduced above and discussed in greater detail below may be implemented in any of numerous ways.

The present disclosure is directed to an interior permanent magnet (IPM) machine in which the magnetic torque and reluctance torque are aligned to improve the peak or total output torque of the IPM machine. In permanent magnet (PM) machines or motors, the output torque includes a magnet (or magnetic) torque and a reluctance torque. In some PM motors, the peak values of the magnetic torque and reluctance torque may sit or reside at different current angles. As such, the total output or peak torque of the PM motor may be low as the angles are further apart from one another. In some implementations, magnets which are provided in a rotor of the PM motor may have a symmetrical "delta" shape. The magnets can be provided in a symmetrical "delta" shape. The magnets can be provided in a symmetrical "delta" shape by each of the magnets having the same relative size (e.g., equal length, equal width, equal thickness, equal magnetic potentials, and so forth) and positioned in a triangular shape with adjacent magnets forming a 60°. In the symmetrical delta shape, the peak value of the magnet torque may be approximately 50°-60° from the peak value of the reluctance torque, thereby limiting the peak total torque output by the PM motor.

To solve these and other technical challenges, proposed herein is an IPM motor or machine in which interior permanent magnets are provided in an asymmetrical delta or triangular shape, to align the magnetic torque and the reluctance torque. The magnets may be provided or arranged in an asymmetrical delta shape comprising three magnets, arranged in a generally triangular shape. The asymmetrical delta shape may be obtained by varying the length, thickness, angles, or position of one or more of the three magnets. For example, the asymmetrical delta shape can be achieved by providing magnets with the same length but different thicknesses which are mounted at the same angle (e.g., relative to an axis of the rotor), by providing magnets with the same thickness but different lengths at different angles relative to the axis of the rotor, or by providing magnets of different thicknesses and lengths at different angles (and various different combinations thereof). Additionally, the top magnet (e.g., atop the magnets forming the V-shape and extending perpendicular to the axis of the rotor) can be shifted towards one of the magnets to provide a further shift in the magnetic torque axis. The asymmetrical delta shape may shift the magnet torque axis, thereby more closely aligning the peak magnetic torque to the peak reluctance torque.

With this technical solution, the peak magnetic torque may be more closely aligned with the peak reluctance torque, thereby realizing a boost in overall torque output by the IPM machine.

FIG. 1 depicts an example motor 100 including a stator 102 and a rotor 104. The stator 102 can at least partially surround the rotor 104. The motor 100 can be or include an alternating current (AC) synchronous motor. The motor 100 can produce torque through AC power supplied to windings of the stator 102 that produce a magnetic field which interacts with various magnets of the rotor 104 in a synchronous manner. The motor 100 can be or include a permanent magnet motor. For example, the motor 100 can include one or more permanent magnets 106-110 mounted, positioned, embedded, attached, coupled, or otherwise provided on or in the rotor 104. The permanent magnets 106-110 can interact with the magnetic field supplied by the windings of the stator 102.

The motor 100 can be used, deployed, or otherwise provided in various settings or applications, including (but not limited to) an electric vehicle (such as electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities), robotics, machinery, or any other application which can use or include a motor.

The motor 100 can include windings 114. The windings 114 can be arranged along a perimeter of the stator 102, such as an interior perimeter of the stator 102 which faces the rotor 104. The windings 114 can receive a drive signal (e.g., an AC drive signal) to output a magnetic field that drives the rotor 104. The windings 114 can output a magnetic field that interacts with the magnetic fields of the permanent magnets 106-110 of the rotor 104, to rotate or drive the rotor 104 about a rotational axis 116 of the rotor. The windings 114 can output a magnetic field which interacts with the magnetic field of the permanent magnets 106-110 of the rotor 104 to produce or output torque for the motor 100.

The permanent magnets 106-110 can be provided at an interior or internal to the rotor 104. In other words, the motor 100 can be or include an interior permanent magnet (IPM) motor. The permanent magnets 106-110 can be or include various types of magnets, such as neodymium magnets (e.g., NdFeb magnets), ferrite magnets, alnico magnets, samarium cobalt magnets, or any other type of magnetic material or alloy.

The permanent magnets 106-110 can have different sizes. For example, the first permanent magnets 106(1)-106(N) can have a first size, the second permanent magnets 108(1)-106(N) can have a second size, and the third permanent magnets 110(1)-110(N) can have a third size. Each of the sizes (e.g., the first size, the second size, and the third size) can be different from one another. The permanent magnets 106-110 can have different sizes by having at least one of different lengths, different widths, different thicknesses, different magnetic strengths, or any other sizing characteristics of magnets. In some implementations, and as described in greater detail below, the permanent magnets 106-110 can have the same dimensions (e.g., same or identical lengths, widths, and thicknesses), but have different magnetic strengths (e.g., by using different magnetic materials) —thereby providing magnets 106-110 having different sizes. Lengths, widths, and thicknesses can refer to a side-to-side distance in a respective direction. For example, lengths can refer to a side-to-side distance in a longitudinal direction, widths can refer to a side-to-side distance in a lateral direction, and thickness can refer to a side-to-side distance in a vertical direction.

As described in greater detail below, the permanent magnets 106-110 can be provided on or in the rotor 104 in a triangular shape with reference to a rotor axis 112. The rotor axis 112 can extend outwardly from the rotational axis 116 of the rotor 104 towards the stator 102. By providing magnets 106-110 having different sizes or at different angles (e.g., where adjacent magnets 106-110 do not each form equal angles with respect to the axis 112), the triangular shape may be an asymmetrical triangular shape. For example, by having a larger sized permanent magnet as the first permanent magnet 106 (e.g., by having a longer, thicker, wider, or greater magnetic strength magnet) than other permanent magnets 108-110, the triangular shape formed by the magnets 106-110 may not be a symmetrical triangular shape (e.g., an isosceles triangle). Having an asymmetrical triangular shape can cause a peak magnet torque to shift towards a peak reluctance torque output by the motor 100, thereby increasing the total torque output by the motor 100.

The rotor 104 can include first and second layers of permanent magnets 106-110. The first layer of permanent magnets can be or include permanent magnets 110(1)-110(N) which are mounted, located, attached, embedded, or otherwise positioned nearest to the surface (or top layer) of the rotor 104. The second layer of permanent magnets can be or include permanent magnets 106(1)-106(N) and 108(1)-108(N) which are arranged between or intermediary to the first layer of permanent magnets 110(1)-110(N) and the rotational axis 116 of the rotor 104. The rotor 104 can include sets of permanent magnets 106(1)-110(1), 106(2)-110(2), 106(N)-110(N). Each set of permanent magnets may include one or more respective magnets from the first layer and two or more respective magnets from the second layer. At least one of the sets of permanent magnets 106(1)-110(1), 106(2)-110(2), 106(N)-110(N) can have an asymmetrical shape. For example, each of the sets of permanent magnets 106(1)-110(1), 106(2)-110(2), 106(N)-110(N) can have an asymmetrical shape. As another example, a subset (but not all) of the sets of magnets 106(1)-110(1), 106(2)-110(2), 106(N)-110(N) can have an asymmetrical shape, while the remaining sets of magnets can have a symmetrical shape. The first layer of permanent magnets can boost, increase, or otherwise provide a magnet torque for the rotor 104, and the second layer of permanent magnets can boost, increase, or otherwise provide a reluctance torque for the rotor 104. The magnet torque and the reluctance torque together may form a total output torque of the motor 100.

As described in greater detail below, the permanent magnets 106-110 can be arranged, positioned, located, embedded, or otherwise provided at respective locations on the rotor 104 to have an asymmetrical triangular shape with respect to the rotor axis 112. The rotor axis 112 can define a symmetrical axis by which the permanent magnets 106-110 are asymmetrical. By providing the permanent magnets 106-110 in an asymmetrical triangular shape with respect to the rotor axis 112, the total torque output of the motor 100 can be boosted by aligning a maximum magnet torque (e.g., provided by the magnetic field of the magnets) with a maximum reluctance torque (e.g., provided by the magnetic reluctance (resistance) resulted from the magnet placement embedded in the rotor 104 at the second layer). The permanent magnets 106-110 can be arranged in an asymmetrical triangular (or delta) shape by providing the permanent magnets 106-110 with different thicknesses, different widths, different lengths, different magnetic strength or potential, or at different angles with respect to the rotor axis 112. If the permanent magnets 106-110 were arranged in a symmetrical triangular or delta shape by providing permanents magnets 106-110 with equal thickness, widths, lengths, strengths, magnetic potentials, etc., a magnet flux axis 118 of the magnets 106-110 could overlap or overlay the rotor axis 112, which could result in a misalignment between the maximum magnetic torque and maximum reluctance torque and thereby reduces the overall torque output. As illustrated in FIG. 1 and described herein, by providing the permanent magnets 106-110 in an asymmetrical triangular (or delta shape), a magnet flux axis 118 can be shifted away from the rotor axis 112 towards the respective second magnets 108, thereby more closely aligning the maximum magnet torque with the maximum reluctance torque.

Figure 3:
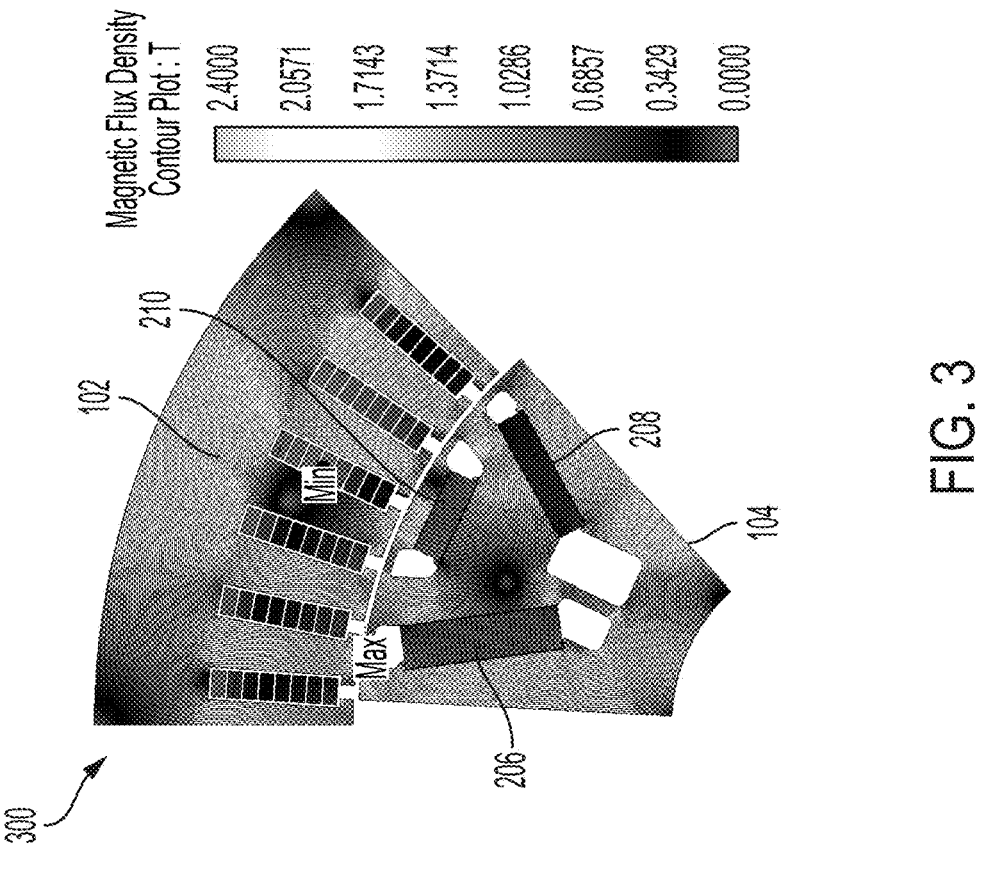
FIG. 3 depicts a magnetic flux lines and flux density view of the portion of the IPM motor of FIG. 2.
Figure 2:
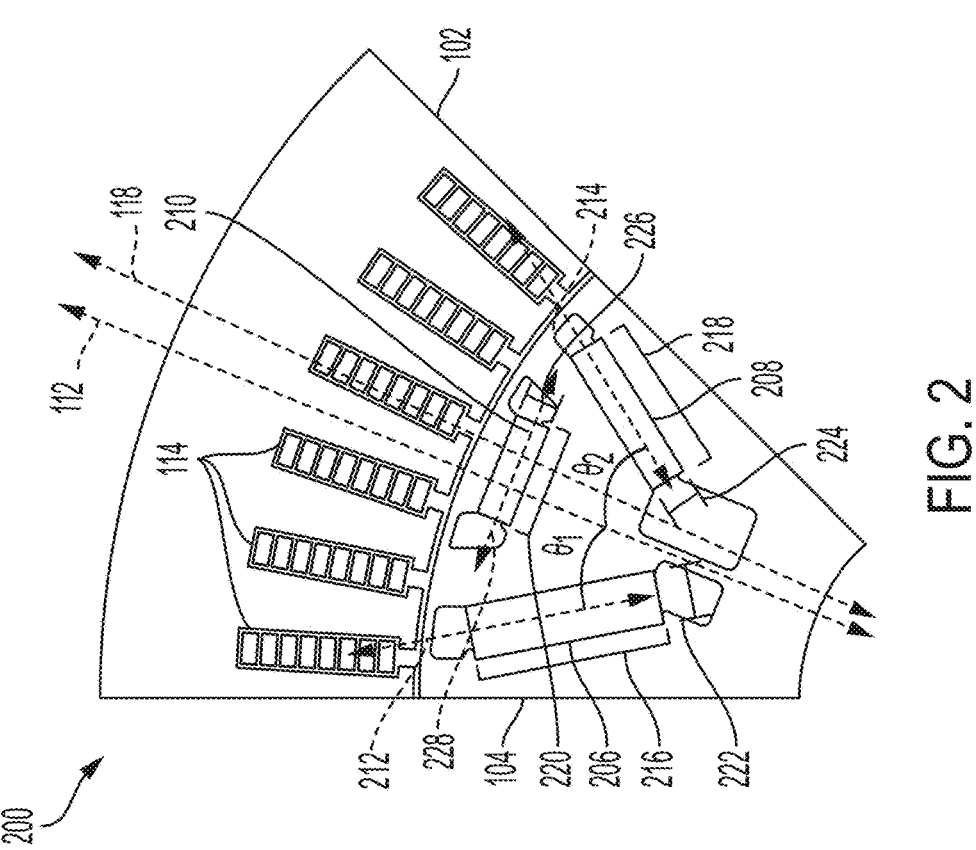
FIG. 2 depicts a portion of an IPM motor, according to a first implementation.
Figure 4:
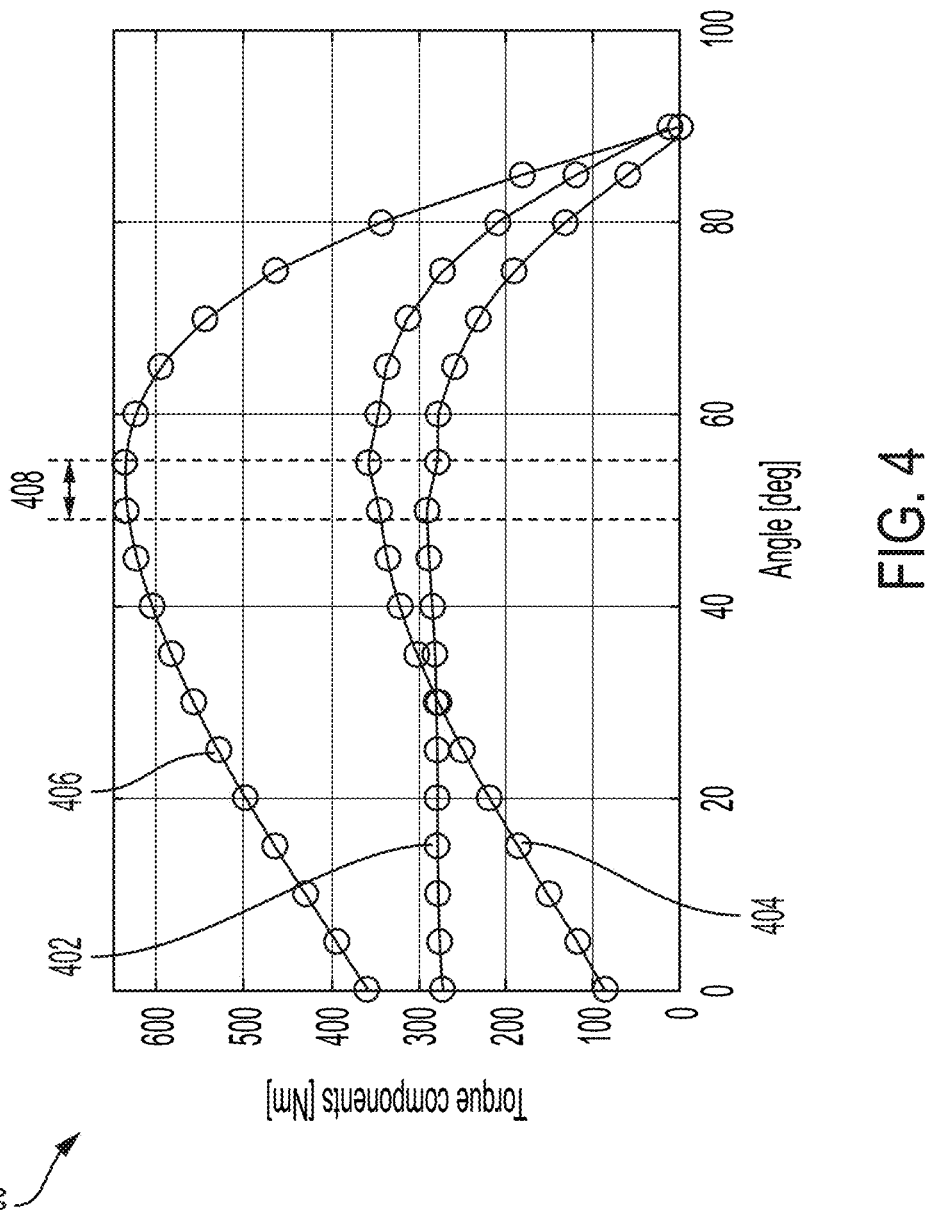
FIG. 4 depicts a graph of torque output by the IPM motor of FIG. 2.

Referring to FIG. 2-FIG. 4, depicted is a view of a portion 200 of the IPM motor 100, a magnetic flux density view 300, and a graph 400 of torque output, respectively, according to a first implementation. In the first implementation, the rotor 104 can include a first permanent magnet 206, a second permanent magnet 208, and a third permanent magnet 210. The first permanent magnet 206 can be similar to the first permanent magnets 106(1)-106(N) of FIG. 1. The second permanent magnet 208 can be similar to the second permanent magnets 108(1)-106(N) of FIG. 1. The third permanent magnet 210 can be similar to the third permanent magnets 110(1)-110(N) of FIG. 1.

Referring to FIG. 2, the first permanent magnet 206, the second permanent magnet 208, and the third permanent magnet 210 can each be mounted, positioned, embedded, attached, coupled, or otherwise provided in an interior of the rotor 104 in a triangular shape. The first permanent magnet 206 can extend along a first magnet axis 212, the second permanent magnet 208 can extend along a second magnet axis 214, and the third permanent magnet 210 can extend along a third magnet axis 228. The first permanent magnet 206 and the second permanent magnet 208 can be provided in or otherwise form a V-shape with respect to the rotor axis 112. In particular, the first magnet axis 212 (along which the first permanent magnet 206 extends) and the second magnet axis 214 (along which the second permanent magnet 208 extends) may form a V-shape. The third magnet axis 228 of the third permanent magnet 210 can extend substantially perpendicular to the rotor axis 112. The first magnet axis 212, the second magnet axis 214, and the third magnet axis 228 may together form a triangular shape. The first magnet axis 212 and the rotor axis 112 can form a first angle $\theta_1$. The second magnet axis 214 and the rotor axis 112 can form a second angle $\theta_2$. In the first implementation, the first angle $\theta_1$ can be substantially equal to the second angle $\theta_2$. The first angle $\theta_1$ can be substantially equal to 30°. The second angle $\theta_2$ can be substantially equal to 30°. The triangular shape formed by the first magnet axis 212, the second magnet axis 214, and the third magnet axis 228 may be a symmetrical triangle, where the first angle $\theta_1$ is substantially equal to the second angle $\theta_2$. Where the first angle $\theta_1$ is substantially equal to 30° and the second angle $\theta_2$ is substantially equal to 30°, the triangular shape formed by the first magnet axis 212, the second magnet axis 214, and the third magnet axis 228 can be an isosceles or equilateral triangle. As described in greater detail below, in the first implementation, since permanent magnets 206, 208, 210 have different sizes, the triangular shape formed by the arrangement and positioning of the permanent magnets 206, 208, 210 may be asymmetrical.

The first permanent magnet 206 can have a first length 216. The second permanent magnet 206 can have a second length 218. The third permanent magnet 210 can have a third length 220. The first length 216 of the first permanent magnet 206 can be substantially equal to the second length 218 of the second permanent magnet 208. The third length 220 of the third permanent magnet 210 can be less than the first length 216 or the second length 218. The third permanent magnet 210 can be positioned between the first magnet 206 and the second magnet 208. The third permanent magnet 210 can be positioned closer to the second permanent magnet 208 than the first permanent magnet 206. For example, the third permanent magnet 210 can be positioned between a first end of the first magnet 206 (e.g., closest to the stator 102) and a first end of the second magnet 208 (e.g., closest to the stator 102), where the third permanent magnet 210 is located closer to the first end of the second magnet 208 than the first end of the first magnet 206. The third permanent magnet 210 can be positioned closer to the first permanent magnet 206 than the second permanent magnet 208. For example, the third permanent magnet 210 can be positioned between a first end of the first magnet 206 (e.g., closest to the stator 102) and a first end of the second magnet 208 (e.g., closest to the stator 102), where the third permanent magnet 210 is located closer to the first end of the first magnet 206 than the first end of the second magnet 208.

The first permanent magnet 206 can have a first width 222. The second permanent magnet 208 can have a second width 224. The third permanent magnet 210 can have a third width 226. The first width 222 of the first permanent magnet 206 can be greater than the second width 224 of the second permanent magnet 208 and the third width 226 of the third permanent magnet 210. The second width 224 of the second permanent magnet 208 can be greater than, less than, or equal to the third width 226 of the third permanent magnet 210. In other words, the first width 222 can be greater than the second width 224 and the third width 226, and the third width 226 can be greater than, less than, or equal to the second width 224. By providing the first magnet 206 with the first width 222 which is greater than the second width 224 and third width 226, the magnets 206, 208, 210 may form an asymmetrical triangle (e.g., asymmetrical with respect to the rotor axis 112), since the first magnet 206 is different than the second magnet 208 with respect to the rotor axis 112.

Referring to FIG. 2 and FIG. 3, depicted is the magnetic flux lines and magnetic flux density plot 300 of the portion 200 of the motor 100 of FIG. 2 during operation. As shown in the magnetic flux line plot 300, the asymmetric rotor structure shifts the magnetic flux density axis 118 from the rotor symmetry axis 112. The magnet flux axis 118 can define the direction of the magnet flux. The asymmetric structure can shift the magnetic line/density axis 118 from the rotor symmetry axis 112, as depicted in FIG. 2 closer to the second magnet 208. As a result, the peak of the magnetic torque can move closer to the peak of the reluctance torque, resulting in a net increase of the total motor torque.

Referring to FIG. 4, depicted is the graph 400 of torque output by the first implementation of the IPM motor 100 of FIG. 2. Specifically, the graph 400 depicts angle in electrical degrees along the x-axis and torque components along the y-axis. The torque components can represent the torque output by the motor 100 at an input AC drive signal supplied to the windings 114. The torque components include a magnet torque 402, a reluctance torque 404, and total torque 406. The total torque 406 can be equal to a sum of the magnet torque 402 and the reluctance torque 404. As shown in FIG. 4, in the first implementation of the IPM motor 100 shown in FIG. 2, the peak magnet torque 402 can be located at approximately 45 electrical degrees, and the peak reluctance torque 404 can be located at approximately 50 electrical degrees. As such, a difference 408 between the peak magnet torque 402 and peak reluctance torque 404 can be approximately 5 electrical degrees. By having the peak magnet torque 402 and the peak reluctance torque 404 more closely aligned (e.g., with the difference 408 as approximately 5 electrical degrees), the total peak torque output by the motor 100 can be increased based on the substantial alignment of the peak magnet torque 402 and peak reluctance torque 404. In the graph 400, the peak total torque can be above 600 Nm, depending on the specific implementation of the IPM motor 100 (e.g., the stator outer diameter, stator length, total magnet usage, peak current, and other implementation details of the IPM motor 100).

Figure 6:
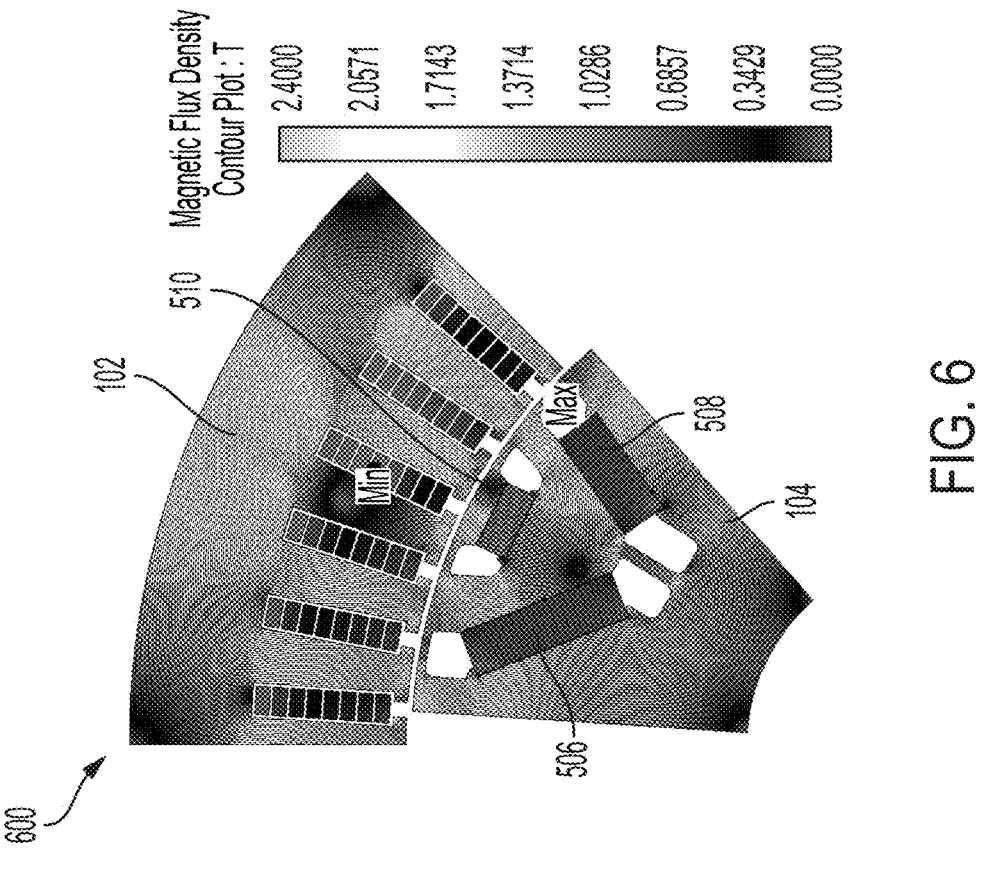
FIG. 6 depicts a magnetic flux lines and flux density view of the portion of the IPM motor of FIG. 5.
Figure 5:
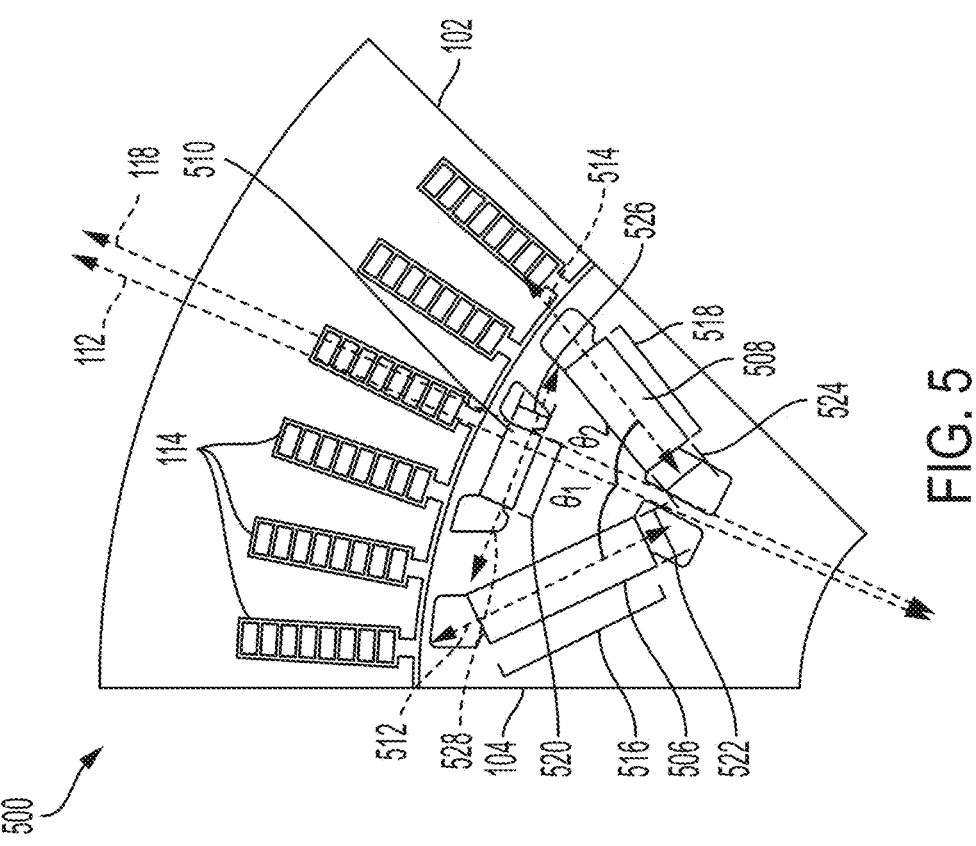
FIG. 5 depicts a portion of an IPM motor, according to a second implementation.
Figure 7:
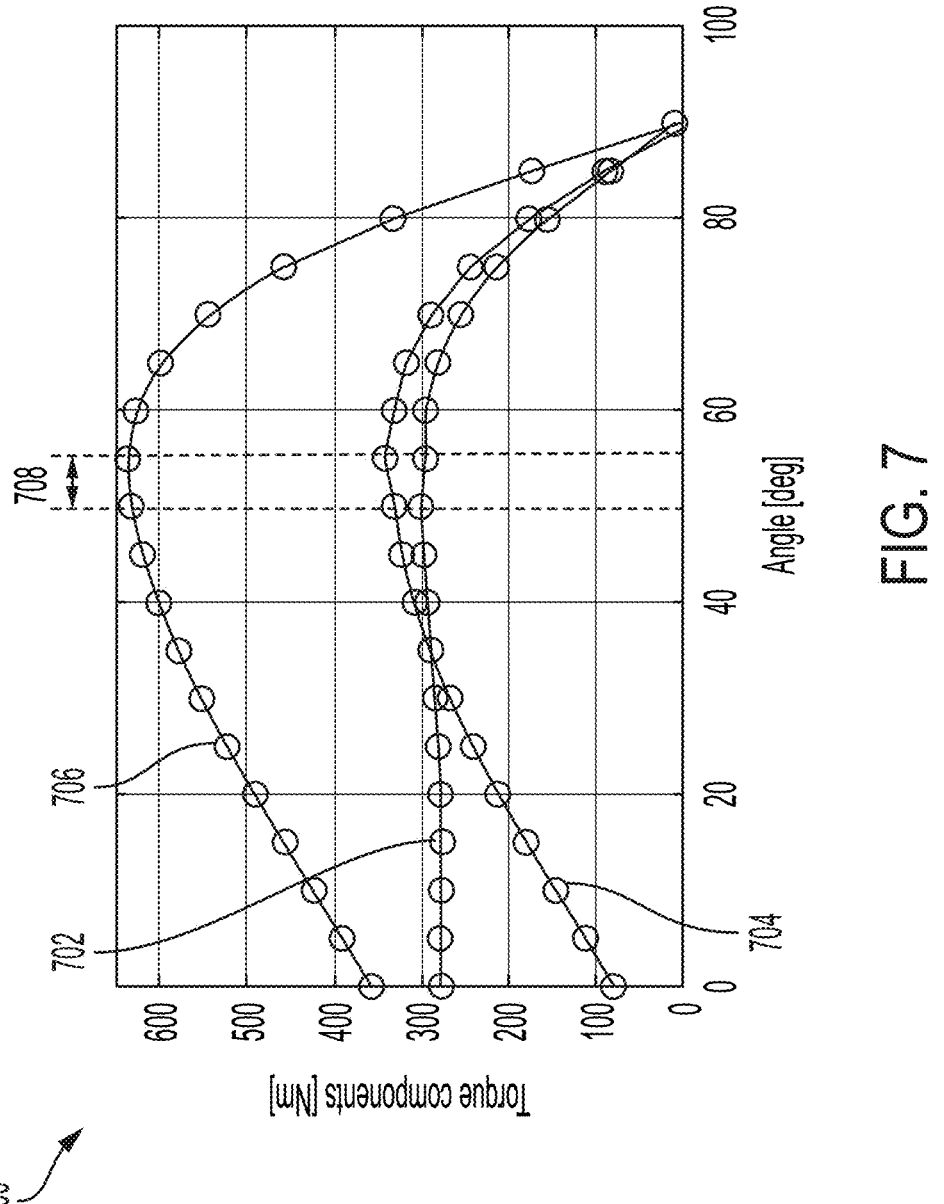
FIG. 7 depicts a graph of torque output by the IPM motor of FIG. 5.

Referring to FIG. 5-FIG. 7, depicted is a view of a portion 500 of an IPM motor 100, a magnetic flux density view 600, and a graph 700 of torque output, respectively, according to a second implementation. In the second implementation, the rotor 104 can include a first permanent magnet 506, a second permanent magnet 508, and a third permanent magnet 510. The first permanent magnet 506 can be similar to the first permanent magnets 106(1)-106(N) of FIG. 1. The second permanent magnet 508 can be similar to the second permanent magnets 108(1)-108(N) of FIG. 1. The third permanent magnet 510 can be similar to the third permanent magnets 110(1)-110(N) of FIG. 1.

Referring to FIG. 5, the first permanent magnet 506, the second permanent magnet 508, and the third permanent magnet 510 can each be mounted, positioned, embedded, attached, coupled, or otherwise provided in an interior of the rotor 104 in a triangular shape. The first permanent magnet 506 can extend along a first magnet axis 512. The second permanent magnet 508 can extend along a second magnet axis 514. The third permanent magnet 510 can extend along a third magnet axis 528. The third magnet axis 528 can be substantially perpendicular to the magnet flux axis 118. The rotor axis 112 can define a central magnet axis about which the magnets 506-510 are asymmetrical. The first magnet axis 512 and the rotor axis 112 can form a first angle $\theta_1$. The second magnet axis 514 and the rotor axis 112 can form a second angle $\theta_2$. In the second implementation, the first angle $\theta_1$ can be greater than the second angle $\theta_2$, thereby providing an asymmetrical V-shape with respect to the rotor axis 112. Where the first angle $\theta_1$ and the second angle $\theta_2$ together equal a 90°, the first magnet axis 512 and the second magnet axis 514 may form an asymmetrical L-shape. The first magnet axis 512, the second magnet axis 514, and the third magnet axis 528 may together form a triangular shape which is asymmetrical with respect to the rotor axis 112. The asymmetric structure of the example shown in FIG. 5 can shift the magnet flux axis 118 from the rotor axis 112. By shifting the magnet flux axis 118 from the rotor axis 112 towards the second magnet 508, the peak of the magnet torque can move closer to the peak of the reluctance torque, thereby resulting in an increase in total torque.

The first permanent magnet 506 can have a first length 516. The second permanent magnet 508 can have a second length 518. The third permanent magnet 510 can have a third length 520. The first length 516 of the first permanent magnet 506 can be greater than the second length 518 of the second permanent magnet 508. The third length 520 of the third permanent magnet 510 can be less than the first length 516. The third length 520 can be less than, greater than, or equal to the second length 518. In this regard, the first permanent magnet 506 can have a different length than the second permanent magnet 508, and the third permanent magnet 510. In some implementations, the first permanent magnet 506, the second permanent magnet 508, and the third permanent magnet 510 can each have different lengths. By providing the first permanent magnet 506, the second permanent magnet 508, and the third permanent magnet 510 with different lengths, the triangular shape can be further asymmetrical (e.g., as compared to permanent magnets having equal lengths, widths, thicknesses, and provided along respective axes that form an equilateral triangle). The first permanent magnet 506 can have a first width 522. The second permanent magnet 508 can have a second width 524. In the second implementation, the third permanent magnet 510 can have a third width 526. The first width 522, the second width 524, and the third width 526 can each be the same (or substantially equal to one another).

The third permanent magnet 510 can be positioned between the first magnet 506 and the second magnet 508. The third permanent magnet 510 can be positioned closer to the second permanent magnet 508 than the first permanent magnet 506. For example, the third permanent magnet 510 can be positioned between a first end of the first magnet 506 (e.g., closest to the stator 102) and a first end of the second magnet 508 (e.g., closest to the stator 102), where the third permanent magnet 510 is located closer to the first end of the second magnet 508 than the first end of the first magnet 506. The third permanent magnet 510 can be positioned closer to the first permanent magnet 506 than the second permanent magnet 508. For example, the third permanent magnet 510 can be positioned between a first end of the first magnet 506 (e.g., closest to the stator 102) and a first end of the second magnet 508 (e.g., closest to the stator 102), where the third permanent magnet 510 is located closer to the first end of the first magnet 506 than the first end of the second magnet 508.

Referring to FIG. 5 and FIG. 6, depicted is the magnetic flux lines and magnetic flux density plot 600 of the portion 500 of the motor 100 of FIG. 5 during operation. As shown in the magnetic flux line plot 600, the asymmetric rotor structure shifts the magnetic flux axis 118 from the rotor axis 112. The asymmetric structure as provided in FIG. 5 can shift the magnetic flux axis 118 from the rotor axis 112, as depicted in FIG. 5. As a result, the peak of the magnetic torque can move closer to the peak of the reluctance torque, resulting in a net increase of the total motor torque.

Referring to FIG. 7, depicted is the graph 700 of torque output by the second implementation of the IPM motor 100 of FIG. 5. Specifically, the graph 700 depicts angle in electrical degrees along the x-axis and torque components along the y-axis. The torque components can represent the torque output by the motor 100 with an input AC drive signal supplied to the windings 114. The torque components include a magnet torque 702, a reluctance torque 704, and total torque 706. The total torque 706 can be equal to a sum of the magnet torque 702 and the reluctance torque 704. As shown in FIG. 7, and similar to FIG. 4, in the second implementation of the IPM motor 100, the peak magnet torque 702 can be located at approximately 45 electrical degrees, and the peak reluctance torque 704 can be located at approximately 50 electrical degrees. As such, a difference 708 between the peak magnet torque 702 and peak reluctance torque 704 can be approximately 5 electrical degrees. Similar to FIG. 4 above, by having the peak magnet torque 702 and the peak reluctance torque 704 more closely aligned (e.g., with the difference 708 as approximately 5 electrical degrees), the total peak torque output by the motor 100 can be increased based on the substantial alignment of the peak magnet torque 702 and peak reluctance torque 704.

Figures 8, 9:
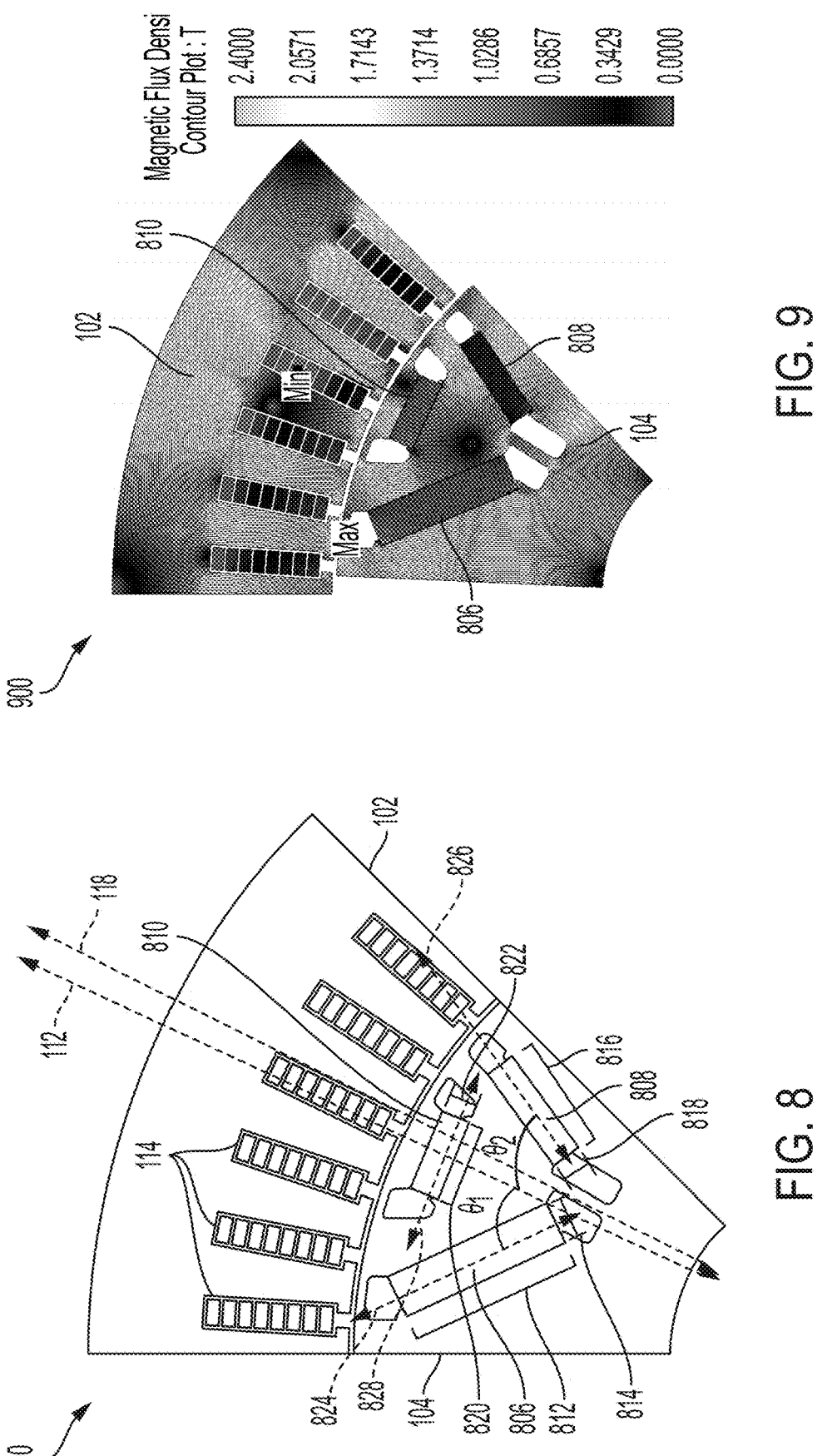
FIG. 8 depicts a portion of an IPM motor, according to a third implementation.
FIG. 9 depicts a magnetic flux lines and flux density view of the portion of the IPM motor of FIG. 8.
Figure 10:
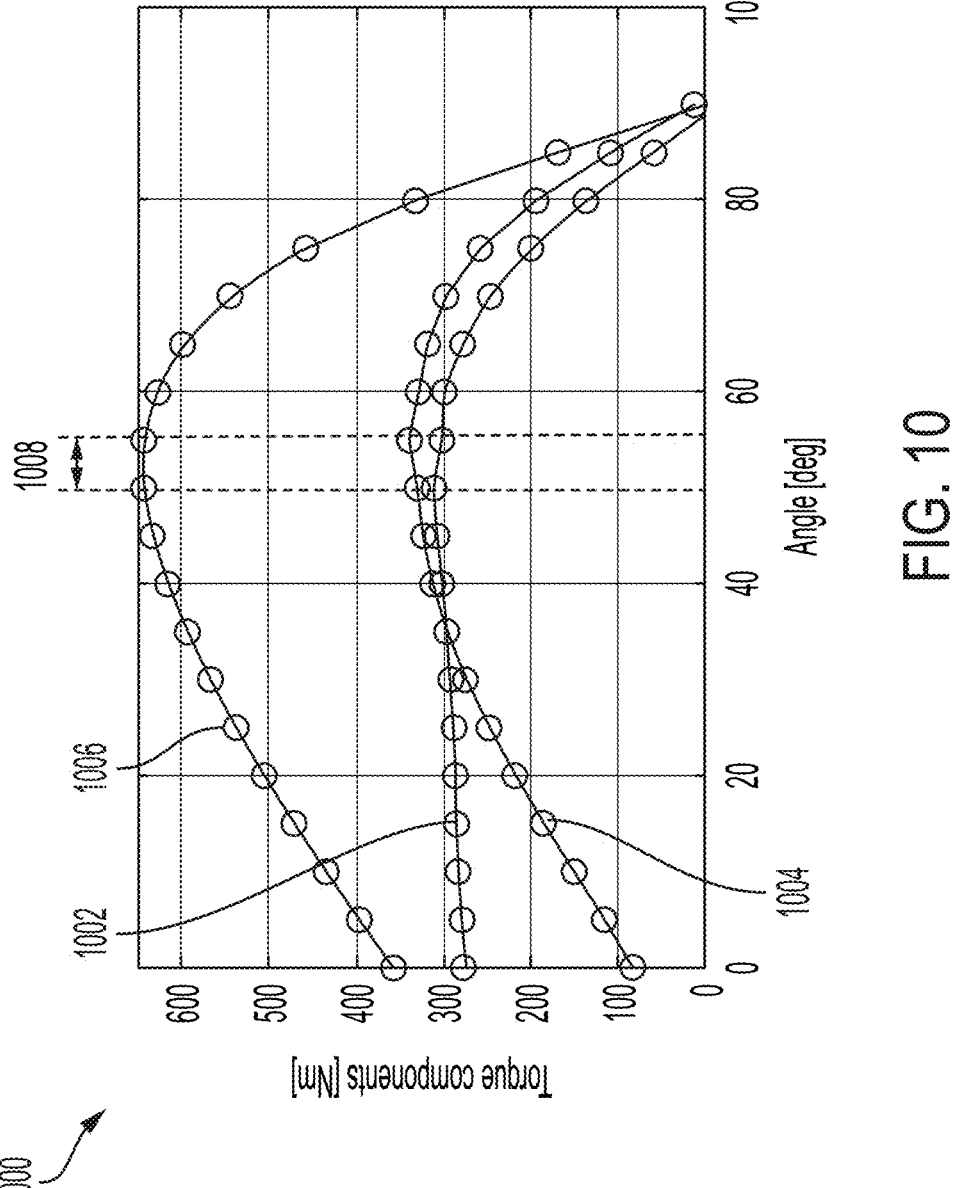
FIG. 10 depicts a graph of torque output by the IPM motor of FIG. 8.

Referring to FIG. 8-FIG. 10, depicted is a view of a portion 800 of an IPM motor 100, a magnetic flux density view 900, and a graph 1000 of torque output, respectively, according to a third implementation. In the third implementation, the rotor 104 can include a first permanent magnet 806, a second permanent magnet 808, and a third permanent magnet 810. The first permanent magnet 806 can be similar to the first permanent magnets 106(1)-106(N) of FIG. 1. The second permanent magnet 808 can be similar to the second permanent magnets 108(1)-108(N) of FIG. 1. The third permanent magnet 810 can be similar to the third permanent magnets 110(1)-110(N) of FIG. 1.

Referring to FIG. 8, the first permanent magnet 806, the second permanent magnet 808, and the third permanent magnet 810 can each be mounted, positioned, embedded, attached, coupled, or otherwise provided in an interior of the rotor 104 in a triangular shape. The first permanent magnet 806 can have a first length 812 and a first width 814. The second permanent magnet 808 can have a second length 816 and a second width 818. The third permanent magnet 810 can have a third length 820 and a third width 822. In the third implementation, each of the lengths and widths may be different across the permanent magnets. In other words, the first length 812 may be different from the second length 816 and the third length 820, and the first width 814 may be different from the second width 818 and the third width 822. The first length 812 of the first permanent magnet 806 may be greater than the second length 816 of the second permanent magnet 808, and the second length 816 of the second permanent magnet 808 may be greater than the third length 820 of the third permanent magnet 810. The first width 814 of the first permanent magnet 806 may be greater than the second width 818 of the second permanent magnet 808, and the second width 818 of the second permanent magnet 808 may be greater than the third width 822 of the third permanent magnet 810. As such, the first width 814 and first length

812 of the first permanent magnet 806 may be greater than each of the second and third widths 818, 822, and the second and third lengths 816, 820.

Similar to FIG. 2 and FIG. 5, the third permanent magnet 810 can be positioned between the first magnet 806 and the second magnet 808. The third permanent magnet 810 can be positioned closer to the second permanent magnet 808 than the first permanent magnet 806. For example, the third permanent magnet 810 can be positioned between a first end of the first magnet 806 (e.g., closest to the stator 102) and a first end of the second magnet 808 (e.g., closest to the stator 102), where the third permanent magnet 810 is located closer to the first end of the second magnet 808 than the first end of the first magnet 806. The third permanent magnet 810 can be positioned closer to the first permanent magnet 806 than the second permanent magnet 808. For example, the third permanent magnet 810 can be positioned between a first end of the first magnet 806 (e.g., closest to the stator 102) and a first end of the second magnet 808 (e.g., closest to the stator 102), where the third permanent magnet 810 is located closer to the first end of the first magnet 806 than the first end of the second magnet 808.

The first permanent magnet 806 can extend along a first magnet axis 824. The second permanent magnet 808 can extend along a second magnet axis 826. The third permanent magnet 810 can extend along a third magnet axis 828. The first magnet axis 824 and the magnet flux axis 112 can form a first angle $\theta_1$. The second magnet axis 826 and the magnet flux axis 112 can form a second angle $\theta_2$. In the third implementation, the first angle $\theta_1$ can be greater than the second angle $\theta_2$, thereby providing an asymmetrical V-shape with respect to the rotor axis 112. The third magnet axis 828 can extend substantially perpendicular to the rotor axis 112. As such, the first magnet axis 824, the second magnet axis 826, and the third magnet axis 828 can form an asymmetrical triangle with respect to the rotor axis 112.

Referring to FIG. 8 and FIG. 9, depicted is the magnetic flux lines and magnetic flux density plot 900 of the portion 800 of the motor 100 of FIG. 8 during operation. As shown in the magnetic flux line plot 900, the asymmetric rotor structure as provided in FIG. 8 can shift the magnetic flux axis 118 from the rotor axis 112 towards the second magnet 808. The asymmetric structure provided in FIG. 8 can shift the magnetic flux axis 118 from the rotor axis 112, as depicted in FIG. 8. As a result, the peak of the magnetic torque can move closer to the peak of the reluctance torque, resulting in a net increase of the total motor torque.

Referring to FIG. 10, depicted is the graph 1000 of torque output by the third implementation of the IPM motor 100 of FIG. 8. Specifically, the graph 1000 depicts angle in electrical degrees along the x-axis and torque components along the y-axis. The torque components can represent the torque output by the motor 100 with an input AC drive signal supplied to the windings 114. The torque components include a magnet torque 1002, a reluctance torque 1004, and total torque 1006 equal to the sum of the magnet torque 1002 and the reluctance torque 1004. As shown in FIG. 10, and similar to FIG. 4 and FIG. 7, in the third implementation of the IPM motor 100, the peak magnet torque 1002 can be located at approximately 45 electrical degrees, and the peak reluctance torque 1004 can be located at approximately 50 electrical degrees. As such, a difference 1008 between the peak magnet torque 1002 and peak reluctance torque 1004 can be approximately 5 electrical degrees. Similar to FIG. 4 and FIG. 7 above, by having the peak magnet torque 1002 and the peak reluctance torque 1004 more closely aligned (e.g., with the difference 1008 as approximately 5 electrical degrees), the total peak torque output by the motor 100 can be increased based on the substantial alignment of the peak magnet torque 1002 and peak reluctance torque 1004.

Notably, across each of the graphs 400, 700, 1000 illustrated in FIG. 4, FIG. 7, and FIG. 10, respectively, the inputs (e.g., stator OD, stator stack length, magnet usage, and peak current) remain constant. However, the peak total torque output by the respective implementations increase based on the asymmetry provided by having permanent magnets of different sizes or at different angles.

Figure 11:
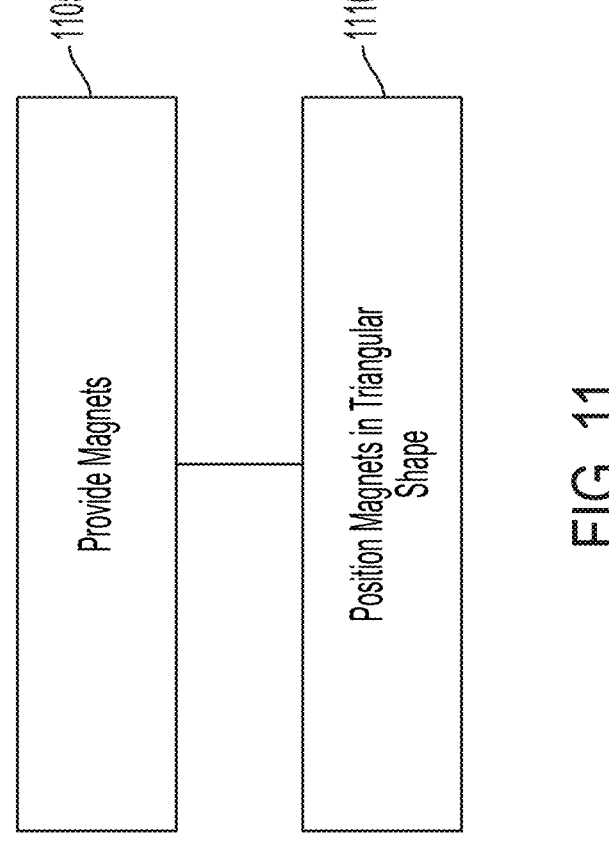
FIG. 11 depicts a flowchart showing an example method of providing an IPM motor.

Referring now to FIG. 11, depicted is a flowchart showing an example method 1100 of providing an interior permanent magnet (IPM) motor. The method 1100 is being described with reference to the elements, components, or hardware described above with reference to FIG. 1-FIG. 10, among others. At ACT 1105, the method 1100 includes providing magnets. At ACT 1110, the method 1100 includes positioning magnets in a triangular shape.

At ACT 1105, the method 1100 includes providing magnets. Providing the magnets can include providing a plurality of magnets. The plurality of magnets can include permanent magnets. The plurality of magnets can include a first magnet having a first size, a second magnet of a second size, and a third magnet of a third size. Each of the first size, the second size, and the third size can be different from one another.

The first magnet, the second magnet, and the third magnet can have different sizes by having different lengths. For example, the first magnet can have a first length and the second magnet can have a second length, where the first length is greater than the second length. Additionally, the third magnet can have a third length. The third length can be less than the first length. The third length can be greater than or less than (or equal to) the second length. In this regard, the first magnet can have a greater size than the second magnet and the third magnet, by having a first length which is greater than the second length and the third length.

The first magnet, the second magnet, and the third magnet can have different sizes by having different thicknesses or different widths. For example, the first magnet can have a first thickness (or first width) and the second magnet can have a second thickness (or second width), where the first thickness or width is greater than the second thickness or width. Additionally, the third magnet can have a third thickness or width. The third thickness or width can be less than the first thickness width. The third thickness or width can be greater than or less than (or equal to) the second thickness width. As such, similar to the different lengths described above, the first magnet can have a greater size than the second magnet and the third magnet, by having a first thickness (or first width) which is greater than the second thickness and the third thickness (or second and third width).

The first magnet, the second magnet, and the third magnets can have different sizes by having different magnetic strengths or potentials. For example, the first magnet can have a first magnetic strength or potential (e.g., by being constructed of or having a first magnetic material) and the second magnet can have a second magnetic strength or potential (e.g., by being constructed of or having a second magnetic material different from the first magnetic material), where the first magnetic strength or potential is greater than the second magnetic strength or potential. Additionally, the third magnet can have a third magnetic strength or potential which is less than the first magnetic strength or potential.

It is noted that various combinations and permutations of different magnets can be provided at ACT 1105. For example, the first magnet, the second magnet, and the third magnet can each have different lengths/thicknesses/widths/ magnetic strength/magnetic potentials. For instance, the plurality of magnets can each have the same length but different thicknesses, can each have the same thicknesses but different lengths, can have the same length and thicknesses but different widths, can each have different thicknesses and different lengths, or can have various combinations or permutations of lengths, widths, thicknesses, magnetic strengths, and so forth.

At ACT 1110, the method 1100 includes positioning magnets in a triangular shape. ACT 1110 can include positioning the plurality of magnets (e.g., provided at ACT 1105) in an arrangement on an interior of a rotor of a motor. The plurality of magnets can be arranged in a triangular shape on the interior of the rotor. The plurality of magnets can be arranged in an asymmetrical triangular shape on the interior of the rotor.

The plurality of magnets can be arranged in the asymmetrical triangular shape with respect to a rotor axis. The rotor axis can extend from an axis of rotation of the rotor towards a stator of the rotor. The rotor axis may form an axis of symmetry to which the triangular shape of the plurality of magnets is asymmetrical. The plurality of magnets can be arranged in the asymmetrical triangular shape, with the first magnet extending along a first axis and the second magnet extending along a second axis. The first axis and the rotor axis can form a first angle, and the second axis and the rotor axis can form a second angle. The first angle can be different from the second angle. For example, the first angle can be greater than the second angle. The third magnet can extend along a third axis. The third axis can be substantially perpendicular to the rotor axis. The third magnet can be positioned closer to the second magnet than the first magnet. By providing the asymmetrical magnets as set forth herein, a magnet flux axis of the plurality of magnets can be shifted relative to the rotor axis, to align the peak magnetic torque with the peak reluctance torque. For example, the magnet flux axis can be shifted away from the rotor axis (which can define an axis of symmetry about which the plurality of magnets are asymmetrical) towards the second magnet.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A rotor comprising:
a plurality of magnets arranged on an interior of the rotor, the plurality of magnets comprising:
   a first magnet having:
      a first length; and
      a first thickness;
   a second magnet having:
      a second length equal to the first length; and
      a second thickness different than the first thickness;
   a third magnet having:
      a third thickness different than the first thickness and the second thickness; and
   the first magnet, the second magnet, and the third magnet arranged in a triangular shape, with the third magnet (i) disposed between the first magnet and the second magnet, and (ii) positioned asymmetrical to a radial axis of the rotor.

2. The rotor of claim 1, the third magnet having a third length different than the first length and the second length.

3. The rotor of claim 1, the first thickness greater than the second thickness.

4. The rotor of claim 1, the first thickness greater than the second thickness and the third thickness.

5. The rotor of claim 1, the third magnet having a third length different from the first length and the second length.

6. The rotor of claim 1, the first magnet extending along a first axis and the second magnet extending along a second axis, wherein the first axis and the radial axis form a first angle and the second axis and the radial axis form a second angle, the first angle being different from the second angle.

7. The rotor of claim 1, the third magnet being positioned closer to the second magnet than the first magnet.

8. The rotor of claim 1, the first magnet having a first magnetic strength, the second magnet having a second magnetic strength, and the first magnetic strength greater than the second magnetic strength.

9. A motor comprising:
a rotor; and
a plurality of magnets arranged on an interior of the rotor, the plurality of magnets comprising:
   a first magnet having:
      a first length; and
      a first thickness;
   a second magnet having:
      a second length equal to the first length; and
      a second thickness different than the first thickness;
   a third magnet having:
      a third thickness different than the first thickness and the second thickness; and
   the first magnet, the second magnet, and the third magnet arranged in a triangular shape, with the third magnet (i) disposed between the first magnet and the second magnet and (ii) positioned asymmetrical to a radial axis of the rotor.

10. The motor of claim 9, the first thickness greater than the second thickness and the third thickness.

11. The motor of claim 9, the third magnet having a third length different from the first length and the second length.

12. The motor of claim 9, the first magnet extending along a first axis and the second magnet extending along a second axis, wherein the first axis and the radial axis form a first angle and the second axis and the radial axis form a second angle, the first angle being different from the second angle.

13. The motor of claim 9, the third magnet being positioned closer to the second magnet than the first magnet.

14. The motor of claim 9, the first magnet having a first magnetic strength and the second magnet having a second magnetic strength, the first magnetic strength greater than the second magnetic strength.

15. A method comprising:
providing a plurality of magnets comprising:
a first magnet having:
a first length; and
a first thickness;
a second magnet having:
a second length; and a second thickness; and
a third magnet having:
a third thickness different than the first thickness and the second thickness; and
positioning the plurality of magnets in an interior of a rotor of a motor, the plurality of magnets positioned in a triangular shape, with the third magnet (i) disposed between the first magnet and the second magnet, and (ii) positioned asymmetrical to a radial axis of the rotor.

16. The method of claim 15, wherein positioning the plurality of magnets comprises:
positioning the plurality of magnets in the triangular shape with respect to radial axis, the first magnet extending along a first axis and the second magnet extending along a second axis, wherein the first axis and the radial axis form a first angle and the second axis and the radial axis form a second angle, the first angle being different from the second angle.

* * * * *